US007347778B2

(12) United States Patent
Rothschild

(10) Patent No.: US 7,347,778 B2
(45) Date of Patent: Mar. 25, 2008

(54) GAMING MACHINE SYSTEM HAVING AUTOMATIC REPORTING FEATURE

(75) Inventor: Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 856 days.

(21) Appl. No.: 10/378,181

(22) Filed: Mar. 3, 2003

(65) Prior Publication Data

US 2004/0176162 A1 Sep. 9, 2004

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................... 463/29; 463/16; 463/40; 463/42

(58) Field of Classification Search ............ 463/16–22, 463/25–29, 40–43, 46
See application file for complete search history.

(56) References Cited

U.S. PATENT DOCUMENTS

| | | | | |
|---|---|---|---|---|
| 4,582,324 | A * | 4/1986 | Koza et al. | 463/16 |
| 5,429,361 | A | 7/1995 | Raven et al. | 273/138 |
| 5,470,079 | A | 11/1995 | LeStrange et al. | 273/138 |
| 5,643,086 | A | 7/1997 | Alcorn et al. | 463/29 |
| 5,655,961 | A | 8/1997 | Acres et al. | 463/27 |
| 6,106,396 | A | 8/2000 | Alcorn et al. | 463/29 |
| 6,117,011 | A | 9/2000 | Lvov | 463/25 |
| 6,149,522 | A | 11/2000 | Alcorn et al. | 463/29 |
| 6,293,866 | B1 | 9/2001 | Walker et al. | 463/20 |
| 6,645,077 | B2 * | 11/2003 | Rowe | 463/42 |
| 6,722,986 | B1 * | 4/2004 | Lyons et al. | 463/29 |
| 6,749,510 | B2 * | 6/2004 | Giobbi | 463/42 |
| 6,773,350 | B2 * | 8/2004 | Yoshimi et al. | 463/42 |
| 6,962,530 | B2 * | 11/2005 | Jackson | 463/29 |
| 6,984,175 | B2 * | 1/2006 | Nguyen et al. | 463/25 |
| 2002/0107072 | A1 | 8/2002 | Giobii | 463/42 |
| 2002/0116615 | A1 * | 8/2002 | Nguyen et al. | 713/168 |
| 2002/0137217 | A1 | 9/2002 | Rowe | 436/42 |
| 2002/0138594 | A1 | 9/2002 | Rowe | 709/219 |
| 2002/0165023 | A1 | 11/2002 | Brosnan et al. | 463/29 |
| 2003/0032485 | A1 * | 2/2003 | Cockerille et al. | 463/43 |

(Continued)

FOREIGN PATENT DOCUMENTS

WO WO 02/058020 A2 7/2002

*Primary Examiner*—Robert E. Pezzuto
*Assistant Examiner*—Binh-An D. Nguyen
(74) *Attorney, Agent, or Firm*—Nixon Peabody LLP

(57) ABSTRACT

The present invention relates to a method of reporting alterations to the operation of a gaming machine. The method includes operating the gaming machine in a standard mode of operation, and subsequently altering the standard mode of operation. In response to this altering, a report is automatically generated for submission to a gaming regulatory agency. The report indicates that the standard mode of operation has been altered. In one common form, the mode of operation being altered is the payout structure, which is information that must be submitted to the gaming regulatory agency in most jurisdictions. In other alternatives, the novel method includes transmitting the report to the agency, possibly automatically via an electronic transmission. The present invention also contemplates gaming machines that are configured to generate such a report, and gaming machine networks that are configured to generate such a report.

47 Claims, 7 Drawing Sheets

U.S. PATENT DOCUMENTS

2004/0068654 A1* 4/2004 Cockerille et al. .......... 713/168
2004/0106452 A1* 6/2004 Nguyen et al. ............... 463/42
2004/0133485 A1* 7/2004 Schoonmaker et al. ....... 705/30

* cited by examiner

GAMING MACHINE SYSTEM HAVING AUTOMATIC REPORTING FEATURE

FIELD OF THE INVENTION

The present invention relates generally to gaming machines and, more particularly, to a method and system for automatically generating a report containing certain operational information ("regulated attributes"), such as changes to a payout structure of a gaming machine, that can be submitted to a gaming regulatory agency.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, operators strive to employ the most entertaining and exciting machines available because such machines attract frequent play and, hence, increase profitability to the operator.

To further enhance a game's profitability and player appeal, gaming machine operators may adjust the payout structure of the gaming machine. For example, to enhance player appeal for a game, the payout structure may be altered to provide a higher hit frequency, but the values of the payouts are lower. This may cause players to spend more time at the gaming machine. Or, if the time of day or week is one during which a certain demographic group is present that usually prefers larger payouts, the payout structure may be altered to provide payouts at a lower hit frequency, but the values of the payouts are higher. Thus, these alterations to the payout structure may occur in response to a certain event (e.g., time).

Furthermore, the gaming machine operator may alter the payout structures for an entire group of games. This may be changed manually through a change in the data (i.e., math tables) stored in the memory device for each of the gaming machines being changed.

Whenever a certain regulated attribute, like a payout structure, is altered, the gaming regulatory agency for that jurisdiction must be instructed of the change. Each jurisdiction has a certain format and content for the report that must be filed. Traditionally, this instruction has been performed by paper reports, although some jurisdictions will allow for electronic reports (i.e., e-mail). In any event, developing and sending this report requires substantial manual effort on the part of the gaming machine operator.

The present invention is directed to overcoming the need to manually generate and transmit reports for the gaming regulatory agencies.

SUMMARY OF THE INVENTION

The present invention relates to a method of reporting alterations to the operation of a gaming machine. The method includes operating the gaming machine in a standard mode of operation, and subsequently altering the standard mode of operation in a manner that alters a regulated attribute. In response to this altering, there is an automatic generation of a report for submission to a gaming regulatory agency. The report indicates that the regulated attribute has been altered. In one common form, the regulated attribute being altered is the payout structure for the gaming machine, which is information that must be submitted to the gaming regulatory agency. As used herein, the term "payout structure" relates to the value of payouts for all of the winning game outcomes in both a basic game or a bonus game, as well as the hit frequency with which these winning game outcomes occur.

In other alternatives, the novel method includes transmitting the report to the agency, possibly automatically, such as through the transmission of an electronic report via e-mail or automatic fax function. Further, common report formats can be stored by the gaming machine or the central casino controller that communicates with the gaming machine.

The present invention also contemplates gaming machines that are configured to generate such a report and gaming machine networks that are configured to generate such a report.

In short, the present invention provides a practical solution to the problem of manually developing these types of reports, which can be quite tedious. In addition, the accuracy of the information developed by the reports can be increased since the present invention contemplates embodiments where there is no manual intervention. As gaming machines become more sophisticated, and there is more of a need to alter the mode of operation, the present invention will become even more important.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

Figure 1:
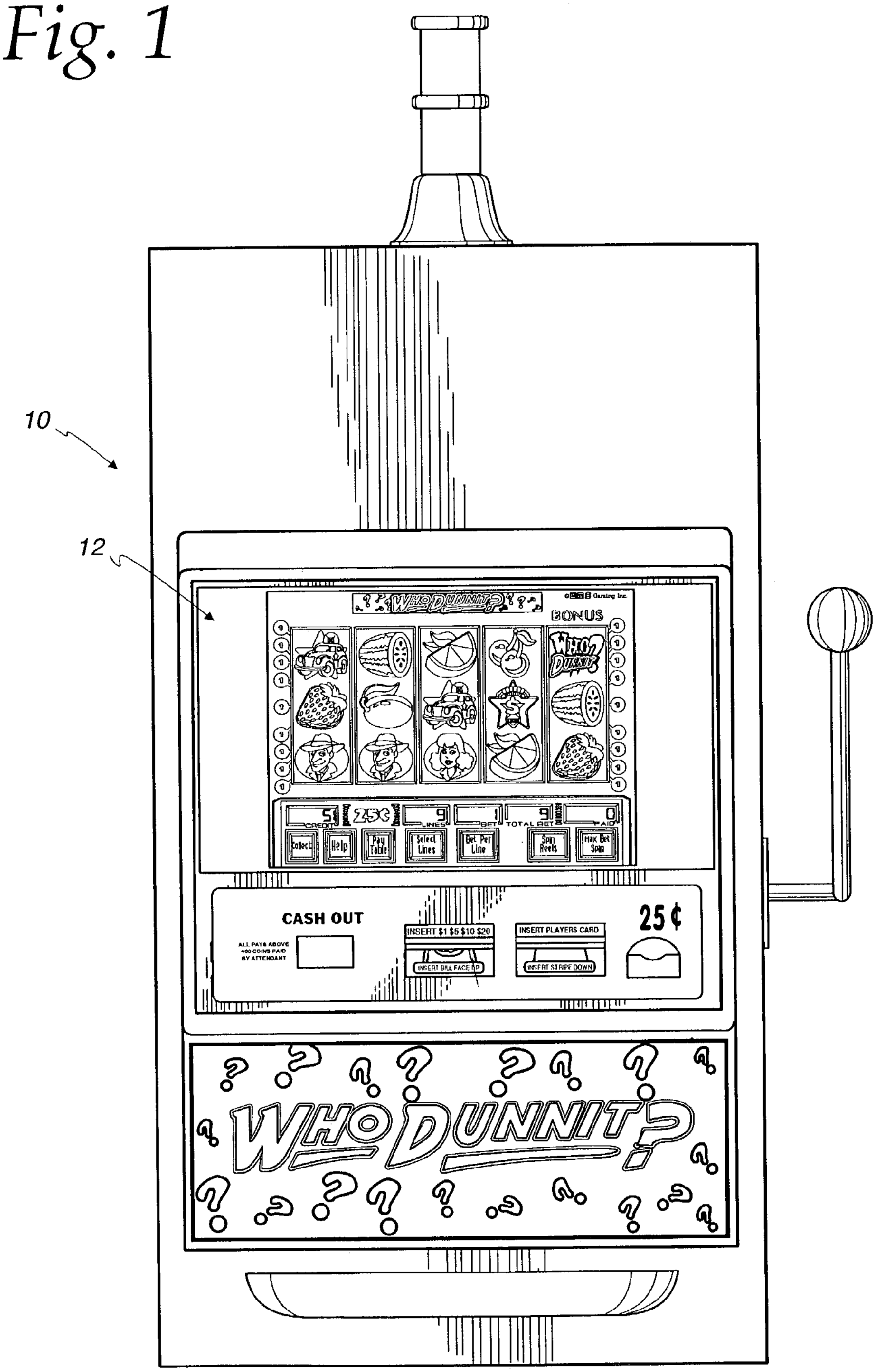
FIG. 1 is a simplified front view of a slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement a wagering game according to the present invention. The gaming machine 10 includes a video display 12 that may comprise a dot matrix, CRT, LED, LCD, electro-luminescent display, or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical reels, other electromechanical devices, or combinations of video and mechanical devices.

In one embodiment, the gaming machine 10 is operable to play a wagering game entitled WHO DUNNIT?™ having a mystery theme. The WHO DUNNIT?™ game features a basic game in the form of a slot machine with five simulated spinning reels (see FIG. 3) and a bonus game that can take on a variety of different formats. It will be appreciated, however, that the gaming machine 10 may be implemented with games other than the WHO DUNNIT?™ game and/or with several alternative game themes.

Figure 2:
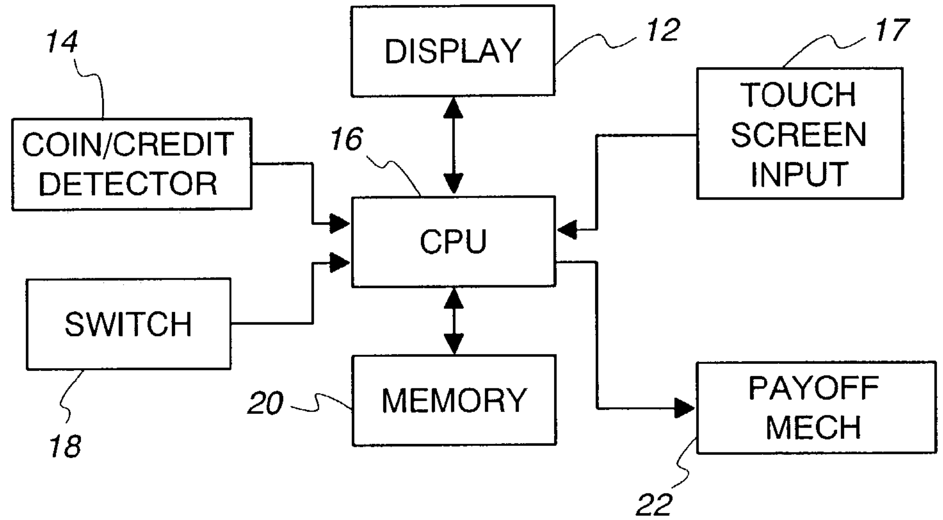
FIG. 2 is a block diagram of a control system suitable for operating the gaming machine in FIG. 1.

FIG. 2 is a block diagram of a control system suitable for operating the gaming machine 10 of FIG. 1. Coin/credit detector 14 signals a CPU 16 when a player has inserted a number of coins or played a number of credits. Then, the CPU 16 executes a game program which causes the video display 12 to display the basic game that includes simulated reels with symbols displayed thereon (see FIG. 3). The player may select the number of paylines to play and the amount to wager via touch screen input keys 17. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, certain basic game outcomes cause the CPU 16 to enter a bonus mode, which causes the video display 12 to show a bonus game that is different from the basic game that used the feels.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in the system memory 20. The payoff amounts corresponding to certain outcomes of the bonus game are also stored in system memory 20.

Figure 3:
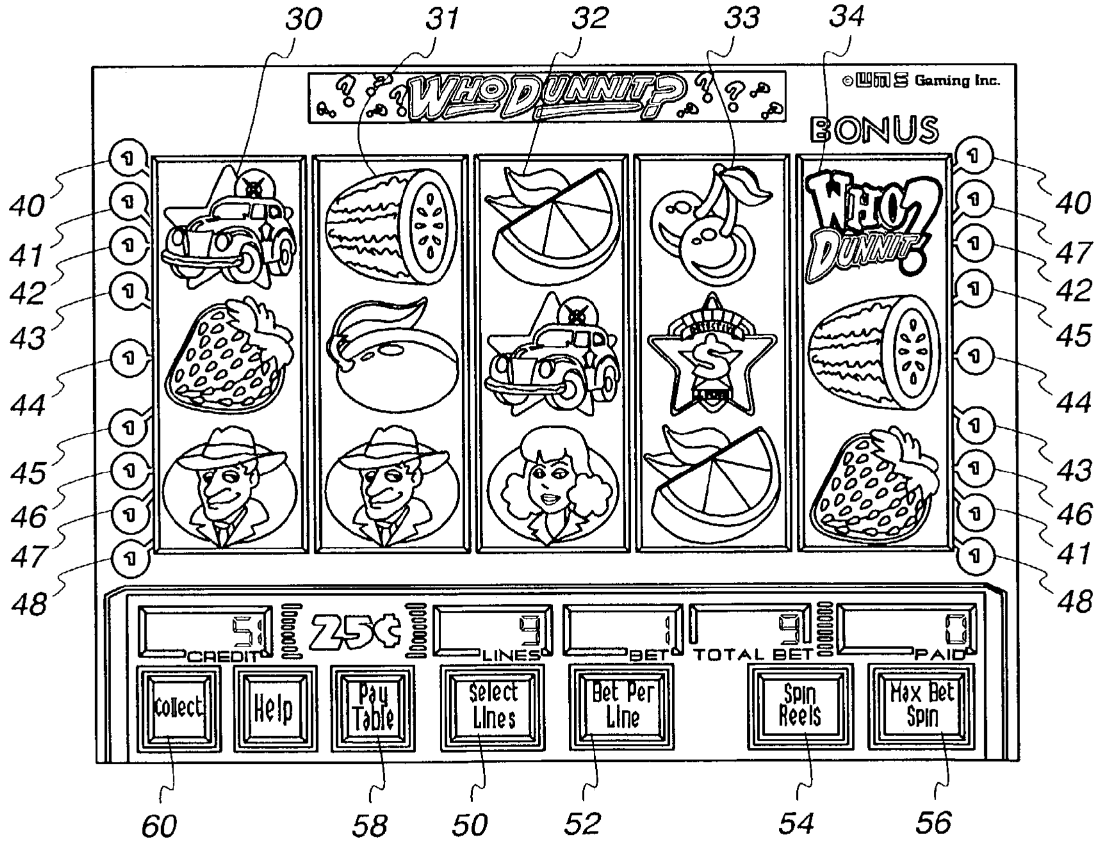
FIG. 3 is a display screen capture associated with a five-reel, nine-line basic game that is played on the gaming machine in FIG. 1.

As shown in FIG. 3, the WHO DUNNIT?™ basic game is implemented on the video display 12 on five video simulated spinning reels 30, 31, 32, 33, 34 (hereinafter "reels") with nine paylines 40-48. Each of the paylines 40-48 extends through one symbol on each of the five reels 30-34. Generally, game play is initiated by inserting a number of coins or playing a number of credits, causing the CPU 16 (FIG. 2) to activate a number of paylines corresponding to the number of coins or credits played. In one embodiment, the player selects the number of paylines (between one and nine) to play by pressing a "Select Lines" key 50 on the video display 12. The player then chooses the number of coins or credits to bet on the selected paylines by pressing the "Bet Per Line" key 52.

After activation of the paylines, the reels 30-34 may be set in motion by touching the "Spin Reels" key 54 or, if the player wishes to bet the maximum amount per line, by using the "Max Bet Spin" key 56 on the video display 12. Alternatively, other mechanisms, such as, for example, a lever or push button, may be used to set the reels in motion. The CPU 16 uses a random number generator (not shown) to select a game outcome (e.g., "basic" game outcome) corresponding to a particular set of reel "stop positions." The CPU 16 then causes each of the video reels 30-34 to stop at the appropriate stop position. Video symbols are displayed on the reels 30-34 to graphically illustrate the reel stop positions and indicate whether the stop positions of the reels represent a winning game outcome. Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30-34 along an active payline correspond to one of the winning combinations on the pay table. If the displayed symbols stop in a winning combination, the game credits the player with an amount corresponding to the award in the pay table for that combination multiplied by the amount of credits bet on the winning payline. The player may collect the amount of accumulated credits by pressing the "Collect" button 60.

Figure 4A:
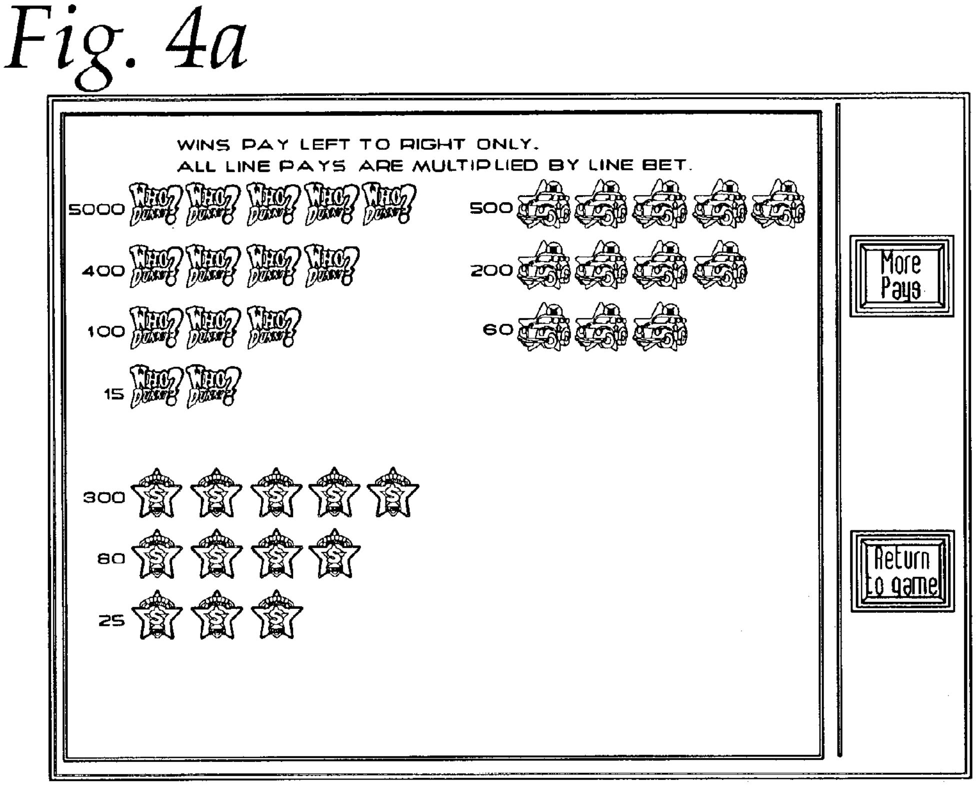
FIGS. 4*a* and 4*b* are pay tables for various winning symbol combinations that may occur in the basic game of the gaming machine in FIG. 1.
Figure 4B:
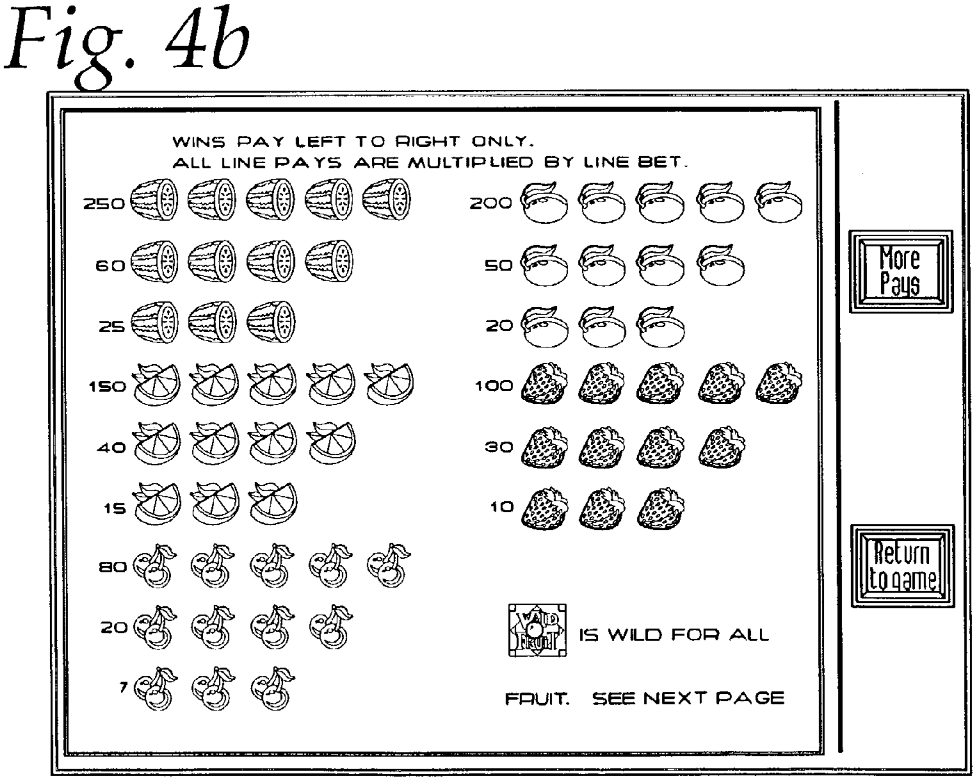

FIGS. 4*a* and 4*b* depict the pay table for the WHO DUNNIT?™ basic game. The pay table enables the player to view the winning combinations and their associated payoff amounts. From the pay table, it can be seen that the WHO DUNNIT?™ basic game includes the following reel symbols that can lead to a payoff in the basic game: WHO DUNNIT, DETECTIVE CAR, BADGE, CHERRY, MELON, PLUM, ORANGE, STRAWBERRY, and MAGNIFYING GLASS.

Included among the plurality of basic game outcomes are a plurality of different start-bonus outcomes for starting play of a bonus game. A start-bonus outcome may be defined in any number of ways. For example, a start-bonus outcome occurs when a special start-bonus symbol or a special combination of symbols appears on one or more of the reels 30-34 in any predetermined display position. The appearance of a start-bonus outcome causes the processor to shift operation from the basic game to a bonus game.

The WHO DUNNIT?™ bonus game is triggered by lining up three DETECTIVE symbols, three SIDEKICK symbols, or any mix of three of these start-bonus symbols on an active payline. In other words, the start-bonus outcomes are the following combinations of start-bonus symbols appearing, in any order, on an active payline: (1) DETECTIVE, DETECTIVE, DETECTIVE; (2) DETECTIVE, DETECTIVE, SIDEKICK; (3) DETECTIVE, SIDEKICK, SIDEKICK; and (4) SIDEKICK, SIDEKICK, SIDEKICK. In FIG. 3, for example, the combination DETECTIVE (reel 30), DETECTIVE (reel 31), and SIDEKICK (reel 32) is on the payline 46. If that payline is active, the bonus game would be triggered. In the illustrated embodiment, the DETECTIVE and SIDEKICK symbols do not appear in the pay table in FIG. 4 and, therefore, cannot generate a winning basic game outcome. These symbols do, however, provide start-bonus outcomes for triggering the WHO DUNNIT?™ bonus game. This bonus game provides the player with an opportunity to be awarded a payoff or coins or credits.

The gaming machine 10 with the pay table of FIGS. 4*a* and 4*b* has a known “payout structure,” which dictates a certain payback percentage that is a function of the various paybacks from both the basic game and the bonus game and the hit frequency for each of these various paybacks. Put simply, the payback percentage is defined as the average percent of each wager that is returned to players. For example, a payback percentage of 96% means that, on average over a relatively long period of time, 96% of all money going into the gaming machine is returned to the players in the form of monetary awards or credits. Thus, a first payout structure may have a low payback amount and a high hit frequency. A second payout structure could have a high payback amount with a low hit frequency. Yet, the first and second payout structures may have substantially the same payback percentage.

The memory device 20 (FIG. 2) contains a math table that dictates the payout structure. The math table includes various factors, including the plurality of all possible game outcomes, the number of occurrences (hits) of each possible outcome in a total cycle, the payout for each outcome, the probability of hitting each outcome, and the expected payout value of each outcome. Thus, a change in the payout structure inherently involves a change in the math table, and vice versa.

Figure 5:
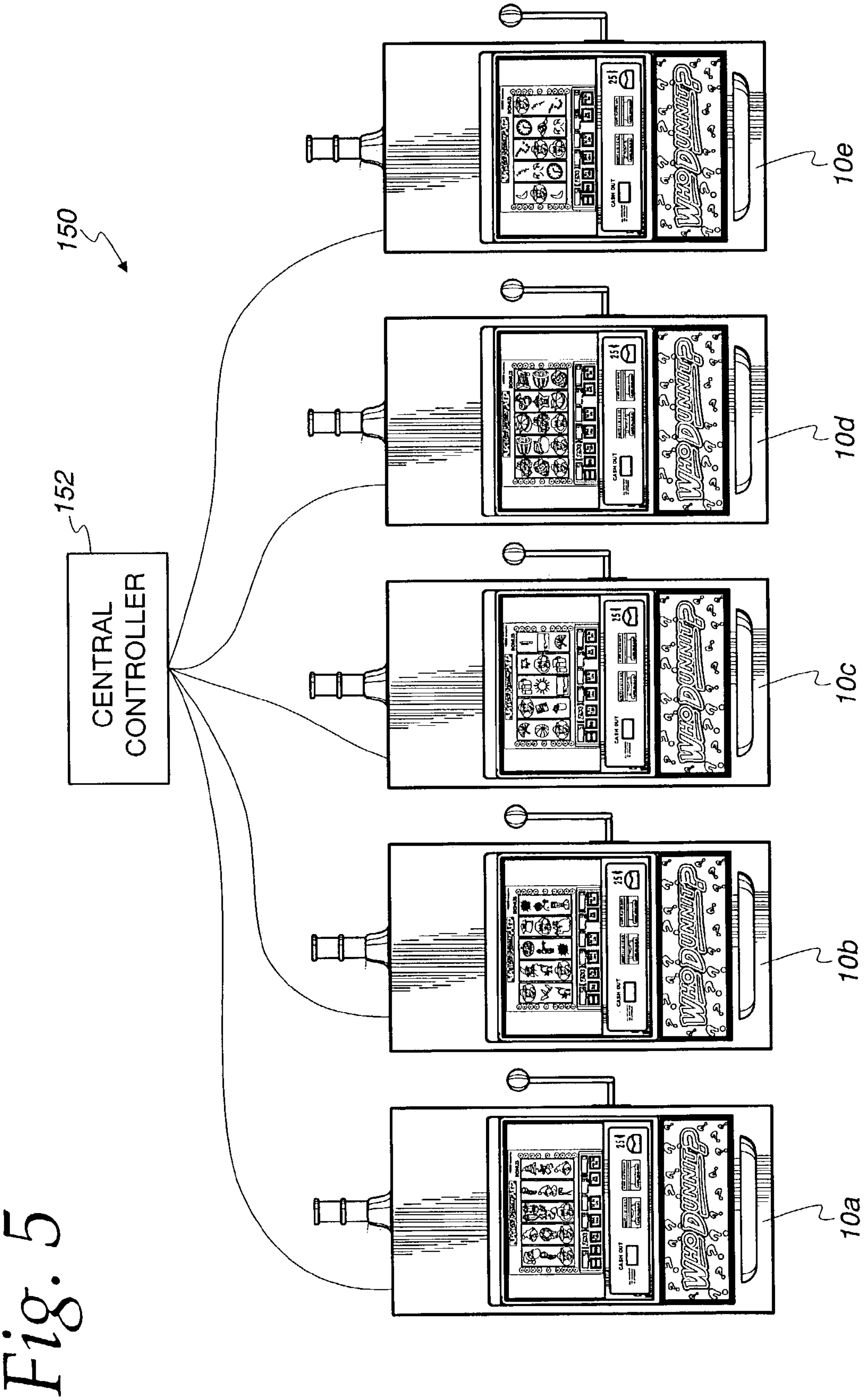
FIG. 5 illustrates a bank of gaming machines that are connected to a common controller.

Referring now to FIG. 5, a gaming machine network 150 is illustrated that includes a central controller 152 that is bi-directionally linked to a plurality of gaming machines 10*a*-10*e*. The gaming machine network 150 is useful for several functions, including monitoring the wagering that occurs at various gaming machines 10*a*-10*e*. And, the central controller 152 may be used to selectively control some aspects of the gaming machines 10*a*-10*e*. Conversely, the gaming machines 10*a*-10*e* may send signals to the central controller 152 to instruct it of certain information, for example, problems that may be occurring in the gaming machines 10*a*-10*e*.

In addition, the payout structures for the gaming machines 10*a*-10*e* may be modified by the central controller 152. The payout structure can be changed in a manner that does not alter the overall payback percentage, or it may alter the overall payback percentage. In fact, when considering an entire bank of machines, the central controller 152 can alter the payout structures for all machines 10*a*-10*e*, such that there is no effect on the overall grouped payback percentage of the bank of gaming machines 10*a*-10*e*.

Instead of the central controller 152 altering the payout structure in response to an operator's command at a user interface, such a change may occur at a predetermined time. For example, between midnight and 1:00 AM, the payout structure may be set such that the payouts are larger, but at a lower hit frequency. As another example, on St. Patrick's Day, the payout structure may be altered to provide lower payouts, but at a higher hit frequency. Such a system where payout structures change as a function of time or other parameters is disclosed in U.S. application Ser. No. 09/922,453 (published as US-2002-0039919-A1), which is owned by the assignee of the present application and is herein incorporated by reference in its entirety.

In yet a further alternative, the memory device containing the math table is manually replaced by an operator of the game. For example, a new memory card may include an updated math table or math tables that could then be selectively utilized to operate the gaming machine.

Figure 6:
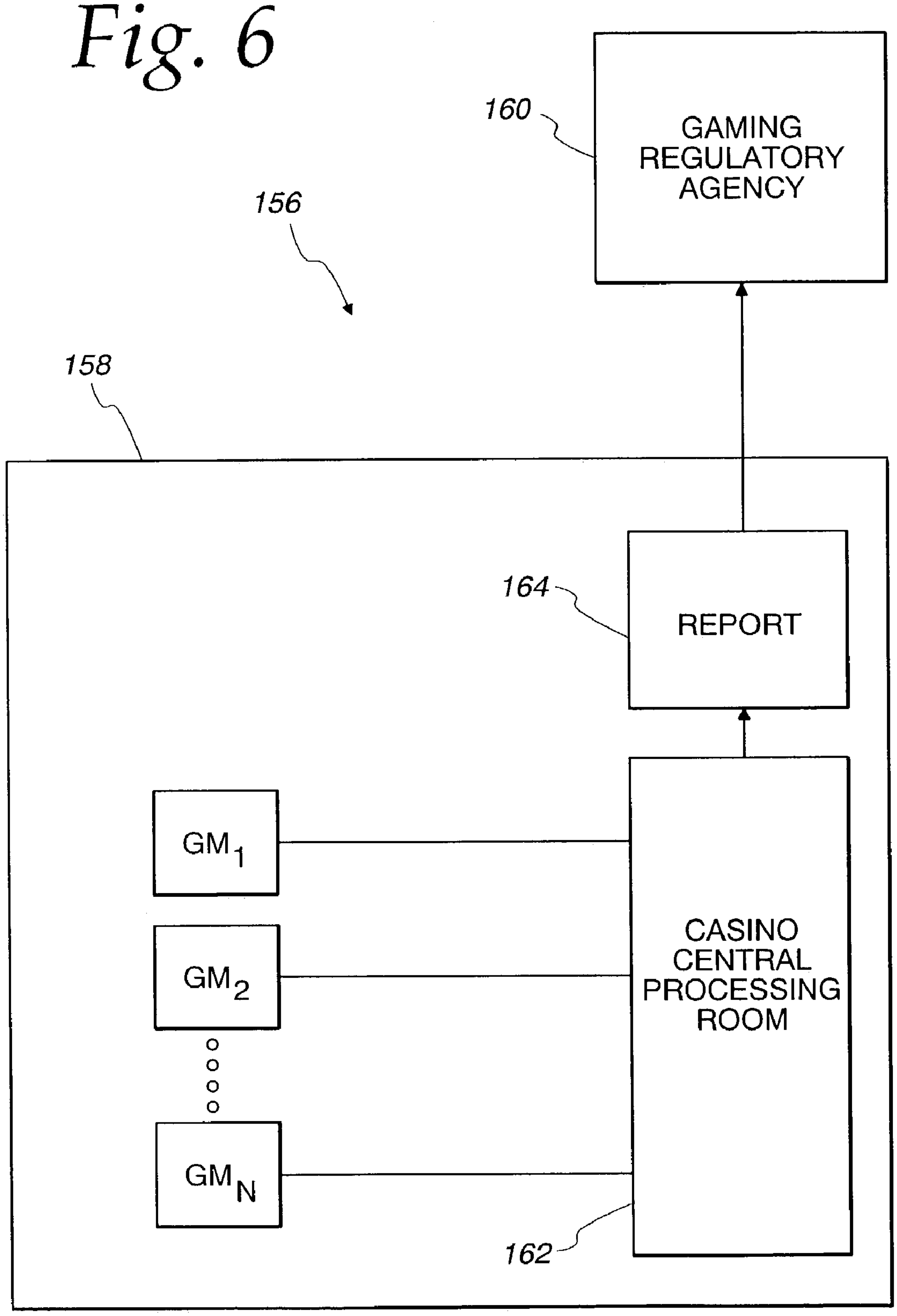
FIG. 6 illustrates one configuration for generating, and possibly sending, a report to the gaming regulatory agency.

FIG. 6 illustrates a report system 156 for use in the typical gaming environment, such as a casino 158. Any change in a regulated attribute of the gaming machines $GM_1$ to $GM_n$, which must be reported to a gaming regulatory agency 160 for the jurisdiction in which the casino 158 resides (e.g., a change in the payout structure), is recorded in a report 164 that is sent to the gaming regulatory agency 160. In FIG. 6, a change in a regulated attribute of one or more of the gaming machines $GM_1$ to $GM_n$ causes that gaming machine to send a signal to a casino central processing room 162. The casino central processing room 162 then generates the report 164 that can be physically sent to the gaming regulatory agency 160 from the casino 158. Thus, in this embodiment, the report 164 is a paper report that can be sent via facsimile, the postal service or any other courier to the gaming regulatory agency 160. Preferably, the change in mode of operation of the machine causes the report 164 to be automatically generated and printed within the casino central processing room 162. At this point, the report 164 must simply be faxed or given to a courier for delivery of the report 164 to the gaming regulatory agency 160.

The format for the report 164 may be stored within a memory device located within the gaming machine, or it can be stored in a memory device located within the casino central processing room 162. In this latter alternative, the gaming machine $GM_1$ to $GM_n$ that is undergoing a change in the regulated attribute sends the necessary information corresponding to that change to the casino central processing room 162, which then fills in the fields within the formatted report (e.g., time of change, type of change, resulting payback percentage, etc) to generate the report 164.

Furthermore, the formats for standard reports filed in several jurisdictions can be stored within the memory device of the gaming machines or at the central processing room 162. Upon the initial setup of the gaming machine $GM_1$ to $GM_n$, the operator of the gaming machine $GM_1$ to $GM_n$ can enter the information regarding the jurisdiction in which the gaming machine $GM_1$ to $GM_n$ resides, thereby automatically setting the required format for the report 164 for that jurisdiction that will be used to subsequently generate the reports 164 that instruct the gaming regulatory agency 160 of a change in the regulated attribute.

While regulated attributes may vary from jurisdiction to jurisdiction, common regulated attributes may include game theme changes, game location changes, denomination changes, software code revisions, circuit board changes that include new memory, and changes to the payout structure.

Figure 7:
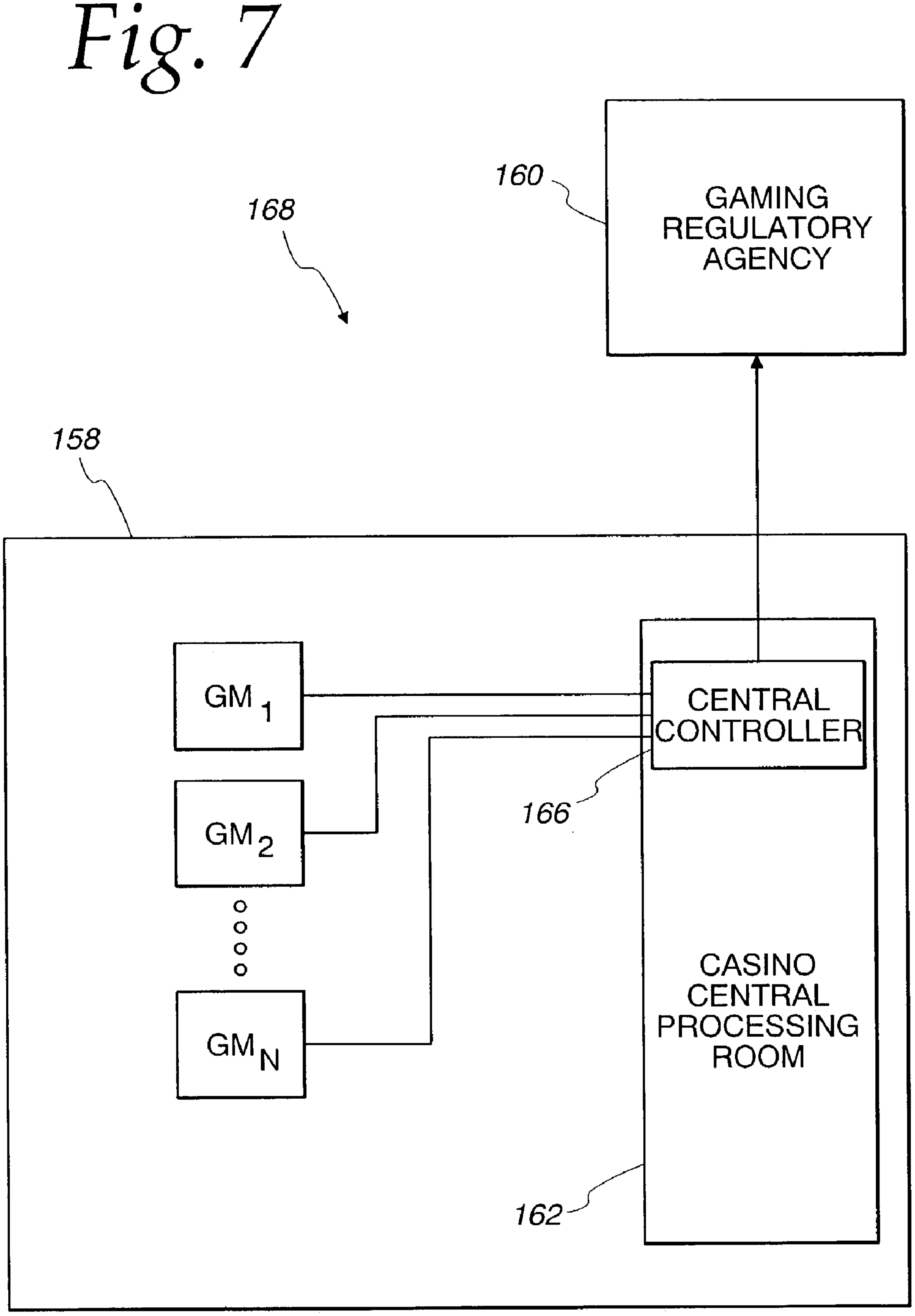
FIG. 7 illustrates an alternative configuration to FIG. 6.

FIG. 7 illustrates an alternative reporting system 168 that can be used by a casino 158 to record a change in the mode of operation of the gaming machines. FIG. 7 specifically includes a central controller 166 in the central processing room 162 that communicates with the gaming machines $GM_1$ to $GM_n$. In this embodiment, the central controller 166 can be in control of the operation of the gaming machines, as discussed with respect to FIG. 5. For example, the central controller 166 may alter the payout structure of the gaming machines $GM_1$ to $GM_n$. After this has been achieved, the central controller 166 generates a report that is electronically submitted to the gaming regulatory agency 160. In other words, instead of a paper report 164 (FIG. 6) being generated, the gaming regulatory agency 160 receives an electronic report. The transmission of this report from the central controller 166 within the casino central processing room 162 can be effectuated by one of many commonly used electronic communication techniques, such as e-mail. It may also include the automatic transmission of a facsimile that is received electronically at the agency 160.

Alternatively, the central controller 166 can generate a paper report that is physically delivered to the gaming regulatory agency 160, as discussed with FIG. 6. Thus, the report could automatically be generated by the central controller 166, viewed by a casino employee for accuracy (or aggregated with other similar reports), and printed by the casino employee for delivery via a courier.

While the embodiments of FIGS. 6 and 7 discuss generating and transmitting a report due to a change in the mode of operation for one gaming machine, it should be understood that such a single report may also include the changes made to several gaming machines $GM_1$ to $GM_n$. In other words, if gaming regulators permit, a single report can be sent that includes information on several gaming machines $GM_1$ to $GM_n$.

Figure 8A:
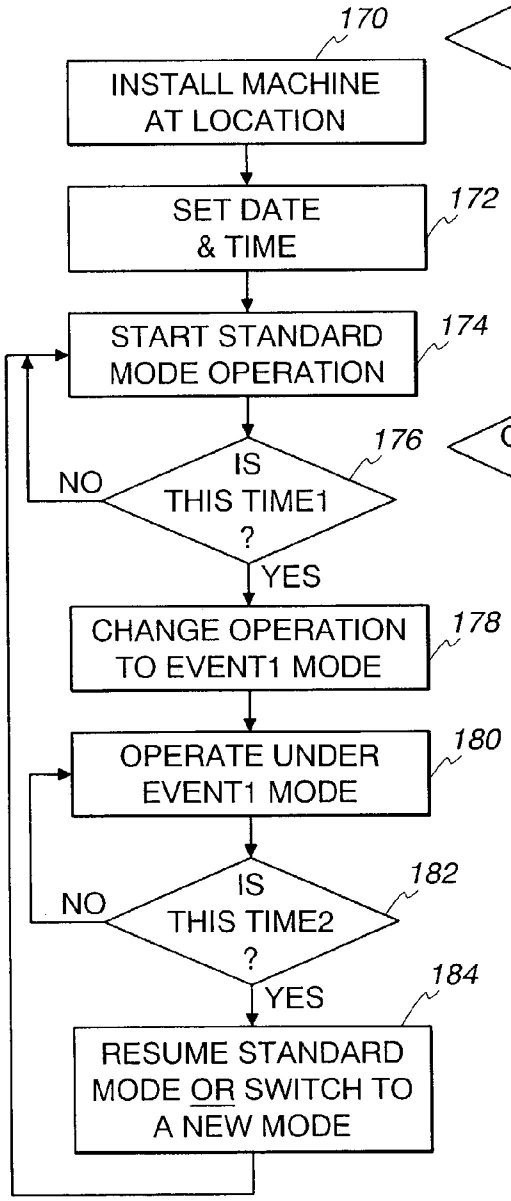
FIGS. 8A and 8B illustrate a set of flow diagrams that show an algorithm for changing a payout structure and automatically developing a report.
Figure 8B:
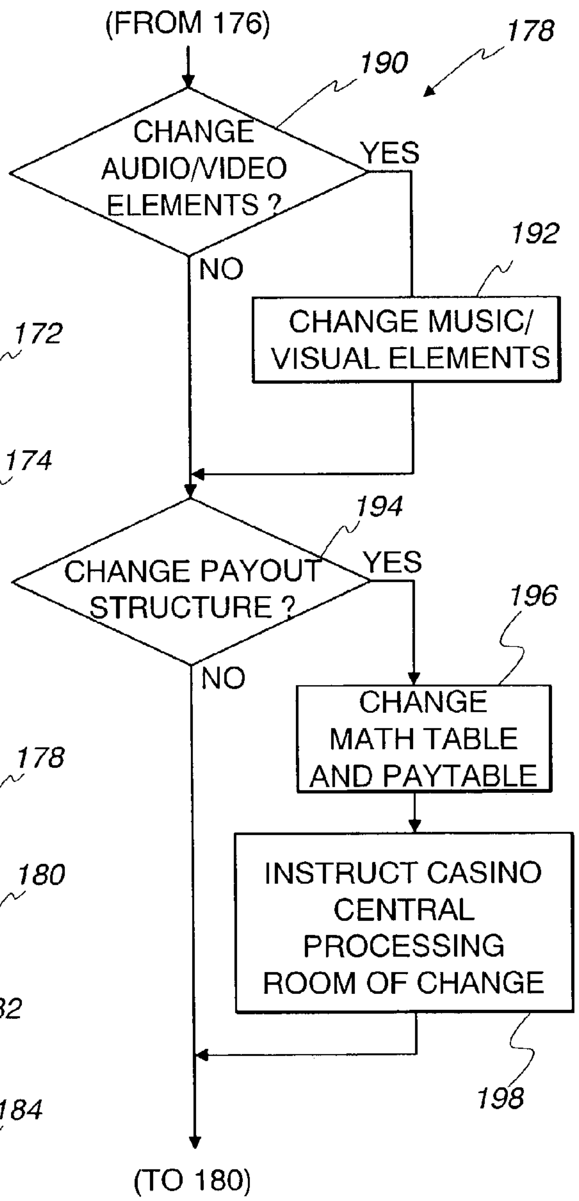

FIGS. 8A and 8B disclose one algorithm that may be used by the gaming machine 10 having the report-developing and report-transmitting functions when the payout structure is changed at a certain time, possibly when other audio or visual elements are also modified. First, at step 170, the machine is installed at a certain location, likely within a casino. Next, at step 172, the data for the time and date on the machine is established so that it is concurrent with real time. This is typically accomplished through setting the internal clock of the CPU 16 (FIG. 2) or an external clock that the CPU 16 (FIG. 2) monitors.

At step 174, the gaming machine 10 begins a standard mode of operation. In the next step, step 176, the CPU 16 (FIG. 2) checks to see if the time is "time1." If the time is not "time1," the machine continues to operate in a standard mode of operation by returning to step 174. If the real time monitored by the CPU 16 (FIG. 2) is "time1," then the gaming machine begins a change of operation (i.e., the "Event1 Mode") illustrated by step 178. In a preferred embodiment, the gaming machine 10 waits until the current game being played by a player at "time1" is finished before altering the visual and audio elements. At step 180, the gaming machine 10 begins operation in the "Event1 Mode." That mode of operation continues until the real time is "time2," as shown in step 182.

When the real time is "time2," as determined at step 182, then the machine resumes the standard mode or can, alternatively, switch to a new mode of operation as shown in step 184. As such, the gaming machine 10 is then operating in the "Event1 Mode" only between the real times corresponding to "time1" and "time2."

FIG. 8B provides one example of the general analysis that may occur under step 178. In step 190, the gaming machine 10 determines whether the "Event1 Mode" requires a change of the audio or audio elements. If it does, then the machine may change the music or visual elements at step 192. If the answer to step 190 is that the "Event1 Mode" of operation does not require changing the audio or visual elements, then the machine proceeds to step 194, whereby the payout structure may be changed. If the payout structure requires changing, then at step 196 a new math table is selected from the memory or downloaded from the central controller at the casino. Additionally, at step 196, the pay table (FIGS. 4*a* and 4*b*) that can be viewed by the player is changed, as well.

Finally, at step 198, the machine instructs the casino central processing room that the change has occurred and that a math-table-change report should be generated for submission to the gaming regulatory agency for that jurisdiction.

The algorithm of FIGS. 8A and 8B generally describes how the gaming machine 10 itself dictates a change in the payout structure. The skilled artisan will recognize that altering the algorithm can occur while still utilizing the report-generating function of the present invention. For example, instead of the event that triggers the change in payout structure being a predetermined time, TIME1, in step 176, the change can take place upon receipt of an external signal from a central controller that is in communication with the gaming machine.

In another type of change to the payout structure, the gaming machine 10 acts to change the frequency at which a player encounters the bonus game while playing the basic game. The basic game includes a plurality of possible randomly-selected basic outcomes. In addition to the basic game generating a basic game payout in response to winning ones of the plurality of basic outcomes, at least one of the plurality of possible basic outcomes is a start-bonus outcome that triggers a bonus game feature that may generate a further payout bonus for the player. The start-bonus outcome has an average hit frequency, which is defined as how often the start-bonus outcome occurs on average relative to the plurality of possible basic outcomes.

In this embodiment, the average hit frequency of the start-bonus outcome is automatically adjusted by the CPU 16 (FIG. 2) based on programmed criteria. Or, the gaming machine 10 may change the average hit frequency of the bonus game as a function of time. For example, the average hit frequency of the start-bonus outcome may be automatically increased by the CPU 16 at a predetermined time. The predetermined time is a certain time of day, time of month, time of year, or even a particular year. Changing the hit frequency of the bonus game may be done with or without altering the payback percentage. In any of these changes to the bonus game, however, a report is generated for submission to the gaming regulatory agency.

The present invention contemplates that uploading or downloading software to operate the gaming machine can trigger the automatic generation of a report that is transmitted to the regulatory agency. Further, uploading or downloading can trigger a notification to casino personnel that the automatic-report generation function must be executed for transmitting a report to the regulatory agency. Likewise, the physical change of a memory device (e.g., EPROM or compact flash) can cause the gaming machine, when initializing operation, to transmit a report. Or, the central controller 152 (FIG. 5) can determine that a change has occurred and transmit a report. The reports can also be generated when a "tilt" condition is detected on a gaming machine.

Furthermore, the central controller 152 (FIG. 5) can determine the best overall operating characteristics for all of the gaming machines and can change various regulated attributes for each machine. In this way, the gaming machine network 150 (FIG. 5) is self-optimizing. When these alterations are made to optimize network performance, the necessary reports can automatically be generated for transmission to the gaming regulatory agency.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of reporting alterations to a payout structure of a gaming machine, comprising:

providing a standard payout structure;

replacing said standard payout structure with a modified payout structure;

after said replacing, automatically generating a report for submission to a gaming regulatory agency, said report indicating said replacing of said standard payout structure with said modified payout structure; and transmitting said report to said gaming regulatory agency.

2. The method of claim 1, further including monitoring real time, and wherein said step of replacing occurs in response to said real time being a predetermined time.

3. The method of claim 2, wherein said predetermined time is a certain time period within a day.

4. The method of claim 2, wherein said predetermined time is at least one day within a year.

5. The method of claim 1, wherein said report is in an electronic format and said transmitting is automatic.

6. The method of claim 5, wherein said electronic format is an e-mail message.

7. The method of claim 1, wherein said report is in a paper format.

8. The method of claim 7, wherein said transmitting occurs via a courier.

9. The method of claim 1, wherein said replacing includes a manual switching by an operator of said gaming machine.

10. The method of claim 1, wherein said standard payout structure has a plurality of first payouts having a first hit frequency and said modified payout structure has a plurality of second payouts having a second hit frequency, said modified payout structure having a payback percentage that is substantially the same as said standard payout structure.

11. The method of claim 1, wherein said automatically generating occurs in a processing room located away from said gaming machine.

12. The method of claim 11, wherein said automatically generating occurs via a central processing unit.

13. The method of claim 12, wherein said replacing includes transmitting instructions from said central processing unit to said gaming machine to effect said replacing.

14. The method of claim 1, wherein said report indicates modifications to payout structures for several gaming machines.

15. A method of reporting alterations to the operation of a gaming machine, comprising:

operating said gaming machine;

altering a regulated attribute of said gaming machine; and in response to said altering, automatically generating a report for submission to a gaming regulatory agency, said report indicating said altering of said regulated attribute.

16. The method of claim 15, further including monitoring real time, and wherein said step of altering occurs in response to said real time being a predetermined time.

17. The method of claim 16, wherein said predetermined time is a certain time period within a day.

18. The method of claim 15, wherein said altering includes manually switching a memory device within said gaming machine.

19. The method of claim 15, wherein said report is in an electronic format and further including transmitting said report to said gaming regulatory agency.

20. The method of claim 19, wherein said transmitting occurs automatically in an electronic form.

21. The method of claim 20, wherein said electronic form is an automated facsimile that is transmitted to said gaming regulatory agency.

22. The method of claim 15, wherein said report is in a paper format.

23. The method of claim 22, further including transmitting said report to said gaming regulatory agency via a couner.

24. The method of claim 23, wherein said regulated attribute is a payout structure, a standard payout structure has a plurality of first payouts having a first hit frequency and a modified payout structure has a plurality of second payouts having a second hit frequency, said modified payout structure having a payback percentage that is substantially the same as said standard payout structure.

25. The method of claim 15, further including recording in a memory device a report format for a jurisdiction in which said gaming regulatory agency resides, said automatically generating including placing information in fields in said report format.

26. The method of claim 25, wherein said memory device is located in said gaming machine.

27. The method of claim 15, further including recording in a memory device a plurality of report formats corresponding to reports to be submitted in various jurisdictions, said automatically generating including selecting a report format for a jurisdiction in which said gaming machine resides and inserting information into fields in said selected report format.

28. The method of claim 15, wherein said regulated attribute is one of a group consisting of game themes, game locations, game denominations, and game software codes.

29. The method of claim 15, wherein said automatically generating occurs in a processing room located away from said gaming machine.

30. The method of claim 29, wherein said automatically generating occurs via a central processing unit.

31. The method of claim 30, wherein said altering includes transmitting instructions from said central processing unit to said gaming machine to effect said altering.

32. The method of claim 29, wherein said report indicates modifications to payout structures for several gaming machines.

33. A gaming machine network, comprising:

a plurality of gaming machines, each of said plurality of gaming machines including a processor for randomly selecting one of a plurality of outcomes of said gaming machine in response to a wager amount; and a central controller in communication with said plurality of gaming machines, said central controller generating a report for submission to a gaming regulatory agency in response to a change in a regulated attribute of at least one of said gaming machines, said report indicating said change in said regulated.

34. The gaming machine network of claim 33, wherein said central controller transmits said report electronically to said gaming regulatory agency.

35. The gaming machine network of claim 33, wherein said report is a paper report.

36. The gaming machine network of claim 33, wherein said central controller is capable of instructing each of said plurality of gaming machines to alter said regulated attribute.

37. The gaming machine network of claim 33, further including a memory device for recording report formats.

38. The gaming machine network of claim 35, wherein said central controller selects a certain report format for said report.

39. A gaming machine, comprising:

a memory device for storing instructions related to a regulated attribute of said gaming machine; and a processor for randomly selecting one of a plurality of outcomes of said gaming machine in response to a wager amount, said processor controlling operation of said gaming machine according to said instructions, said processor sending a report-generating signal external to said gaming machine for allowing a report to be generated in response to said regulated attribute being altered.

40. The gaming machine of claim 39, wherein said regulated attribute is a payout structure, said report-generating signal being sent in response to a change in said payout structure.

41. The gaming machine of claim 40, wherein said change in said payout structure occurs through manual replacement of said memory device.

42. The gaming machine of claim 40, wherein said change in said payout structure occurs automatically in response to a certain event.

43. The gaming machine of claim 40, wherein said change in said payout structure occurs automatically in response to receipt of an external signal commanding said change.

44. The gaming machine of claim 40, wherein said change in said payout structure relates to changes in a hit frequency or a payout amount for a bonus game.

45. The gaming machine of claim 39, wherein said regulated attribute is one of a group consisting of game themes, game locations, game denominations, and game software codes.

46. The gaming machine of claim 39, wherein said report is one of a group consisting of an automated facsimile, an e-mail message, and a paper report.

47. The gaming machine of claim 39, wherein said regulated attribute is altered via downloading instructions to be stored in said memory device.

* * * * *

UNITED STATES PATENT AND TRADEMARK OFFICE

CERTIFICATE OF CORRECTION

PATENT NO. : 7,347,778 B2
APPLICATION NO. : 10/378181
DATED : March 25, 2008
INVENTOR(S) : Wayne H. Rothschild It is certified that error appears in the above-identified patent and that said Letters Patent is hereby corrected as shown below:

In column 3, please replace line 47 with the following:

-- basic game that used the reels. --

In column 10, Claim 23, please replace line 10 with the following:

-- courier. --

Signed and Sealed this

Eighth Day of July, 2008

JON W. DUDAS
*Director of the United States Patent and Trademark Office*